Feb. 21, 1928.
C. H. COLVIN
1,660,152
TURN INDICATOR
Filed April 1, 1922
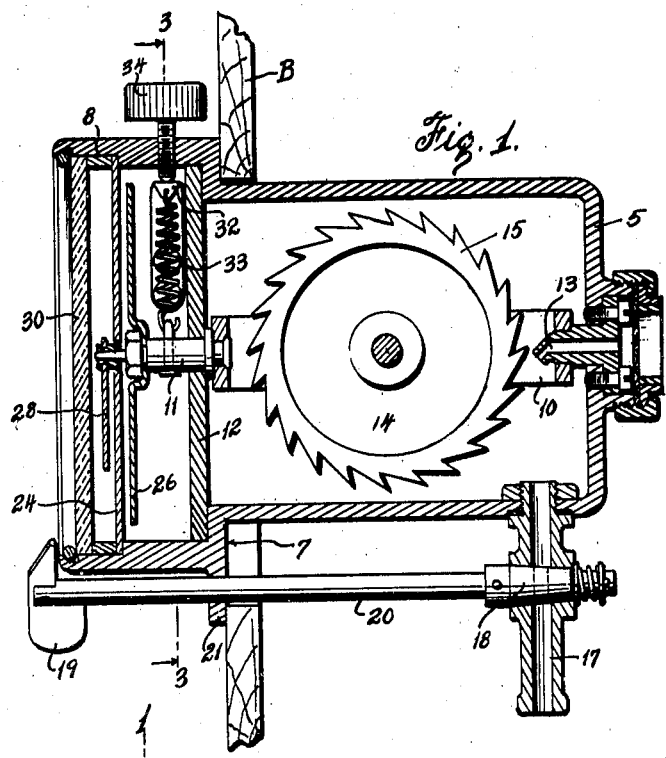
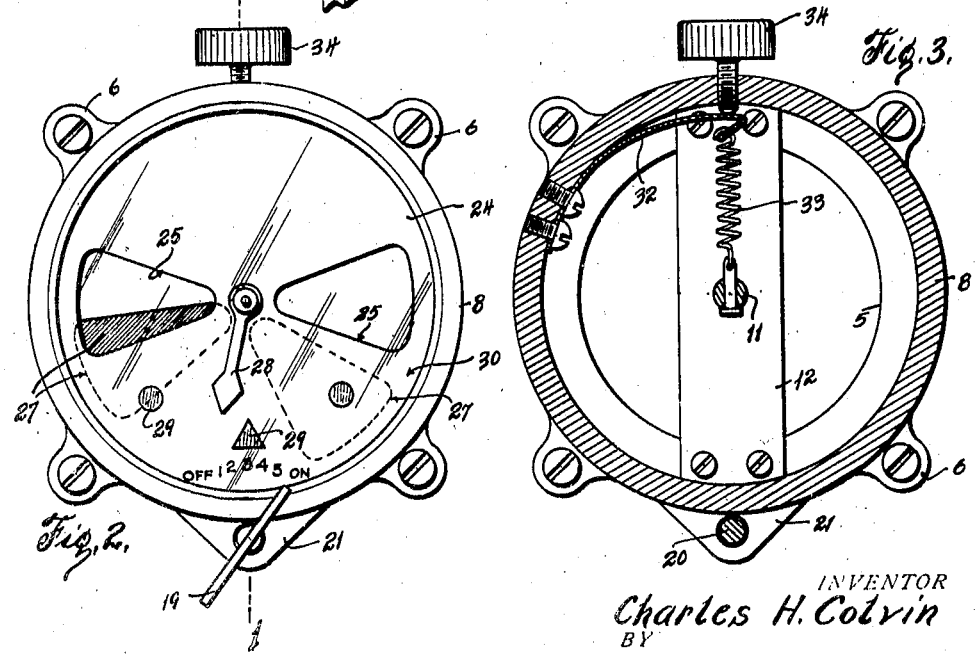
INVENTOR
Charles H. Colvin
BY
James C. Ledbetter ATTORNEY Patented Feb. 21, 1928.

1,660,152

UNITED STATES PATENT OFFICE.

CHARLES H. COLVIN, OF BROOKLYN, NEW YORK.

TURN INDICATOR.

Application filed April 1, 1922. Serial No. 548,717.

This invention relates to instruments for indicating angular motion, and more particularly relates to improvements in turn indicators.

An object of the invention is to improve upon a similar instrument shown and described in my copending application for patent filed July 15, 1919, Serial No. 308,861.

Another object of the invention is to provide a navigating instrument for vehicles, and particularly for aircraft, to indicate to the pilot any deviation off a straight course, in order that the craft may be more safely and accurately navigated.

It is a particular object to produce an improved turn indicator having conveniently located adjusting means whereby the operating characteristics of the indicator may be varied throughout a wide range so as to be adaptable for any conditions of service.

A navigating instrument constructed in accordance with the plans of this invention embodies an airtight case in which is mounted a gyroscope which preferably is driven by air. An indicator is connected with the gyroscope and produces indications due to the precessional motion of the gyroscope. Due to the design and construction of the instrument, it is desirable to locate the indicating means in clear view in one end of the instrument case, and dispose the air-spun mechanism in the other end of the case. In order that the pilot may conveniently regulate the action of the instrument, or stop and start it, a control handle is mounted on the front of the instrument adjacent the indicating face; and in addition thereto another adjustment means is mounted near the front of the case for the purpose of permitting the operator to quickly and conveniently vary the characteristics of the instrument to adapt it to weather conditions or temperamental wishes of the pilot.

The accompanying drawings illustrate an embodiment of my invention and though there is shown a preferred form of construction and operation, I claim the right of protection to such changes as may come within the scope of my invention.

Figure 1 illustrates a longitudinal sectional view taken through the instrument on the line 1—1 of Figure 2; and the instrument is shown mounted on an instrument board for the purpose of bringing out particularly the improved features which relate to the control of the instrument.

Figure 2 illustrates a face view of the turn indicator, and an indication of turning movement is shown on the face thereof.

Figure 3 illustrates a cross-sectional view as taken on the line 3—3 of Figure 1, to show certain sensitivity adjustment features.

With further reference to the drawings for a detailed description of the invention, there is shown a case 5 made substantially airtight. This case has lugs 6 by which the instrument is installed in service position on an instrument board B; and the case may be constructed so as to be larger on the front end than the rear portion, in order that a large and prominent circular indicating face be provided. The reduced rear portion 5 of the case forms a shoulder or flange 7 which fits against the instrument board, and the enlarged front case 8 contains the elements composing the indicating means.

A gyroscope frame 10 is pivotally carried in the case, the front end of the frame being fixed to a pin 11 which is journaled in a spider 12, while the other end of the frame is pivotally supported on a hollow journal constructed in the form of an air nozzle 13. A gyroscope rotor or wheel 14 is journaled in the frame 10 and has a notched or serrated periphery 15 against which the air strikes when issued under pressure from the nozzle 13.

An air take-off pipe or exhaust valve 17 is secured in the casing and a valve core 18 is rotatably carried in this exhaust valve. A thumb piece or control handle 19 is disposed adjacent the front of the instrument and has connection with the valve core 18 through a rod 20. The valve core 18 is rotated in the exhaust valve by turning the control handle 19 for throttling or restricting the passage through the valve 17, or for closing the same to stop the operation of the turn indicator. A lug or ear 21 supports the front end of the valve rod 20, so as to operatively dispose the control handle 19 near the front end of the instrument and adjacent the indicating face. An exhaust pump, or any suitable source of suction, is attached to the exhaust valve 17 for evacuating the case to induce air under pressure through the nozzle 13 to spin the gyro wheel 14.

For aeronautical purposes, it is often desirable to connect a Venturi tube to this exhaust pipe for drawing the air from the case, so that I have shown a pipe 17 to which a flexible tube may be attached.

In the front end of the enlarged portion 8 of the case, there is mounted a dial 24 which has view openings through which a movable indicating means is observed by the pilot. The said indicating means comprises a shutter made in the form of a disc 26 anchored to the pin 11. This shutter 26 is provided with suitable indicating markings in the form of a shaded, printed, or painted portion 27, which shaded portion is preferably made of similar shape to the view openings 25.

The pin 11 is reduced in size and projects through the dial 24. An indicating hand 28 is anchored to the end of the pin 11 and is adapted to swing back and forth over the dial 24. The dial 24 is provided with marks 29 by which the pilot judges the distance and directions of swing or travel of the hand 28. To facilitate the use of the control handle 19, there may be printed "Off" and "On" marks on the dial 24 adjacent the end of the handle 19; and numeral or degree marks, may to advantage, be imprinted on the dial between the "Off" and "On" signs, so that the pilot is facilitated in the setting of the valve 18 for most efficient operation. A transparent cover or glass plate 30 is affixed to the front of the instrument and forms an airtight seal with the casing.

A plate spring 32 has one end anchored to the wall of the casing and the other end disposed directly over the pin 11. A coiled tension centralizing spring 33 has one end thereof secured to the pin 11 and the other end secured to the free end of the spring 32. An adjustment screw 34 has its lower inner end bearing against the spring 32, and this adjustment screw may be turned in or out to depress or lift the plate spring 32, which varies the strength of the centralizing spring 33. By relieving the tension on the centralizing spring 33, the gyroscope 10—14 is given more precessional freedom, and by increasing the tension on the centralizing spring the gyroscope is restricted to precess thru a smaller angle and therefore gives a smaller indication. By adjusting the strength of the centralizing spring 33, the indicator can be made more or less sensitive; that is, by increasing the tension of the spring, a given angular motion will cause a smaller indication, and by decreasing the tension of the spring the same angular motion will give a larger indication.

The centralizing spring 33 tends at all times to hold the gyro element and indicating means in a zero or neutral position. If the instrument is not subjected to angular motion, say the turning of the vehicle, then the indicator is held in a central position and shows that there is no turning motion. If the instrument and vehicle are subjected to a slow angular motion, then the gyroscope precesses, whereupon the centralizing spring opposes the force of precession to the extent that the indicator comes to rest at one side of the neutral position, thus showing that a turning movement exists and showing the rate and direction of said turn. If the angular motion is increased the indication will also increase and vice versa. It is seen therefore that the centralizing spring means causes the indicator to point out, not only the direction of the turn, but also the rate of speed of the turn.

Besides providing an easily accessible means for starting and stopping the gyroscope, the air control handle 19 is used to vary the speed of the gyroscope and thus vary the sensitivity of the indicator by changing the amount of force that the gyroscope can exert.

As is well known to those versed in the art, small gyroscopic instruments used on aircraft are usually driven by air suction which may be obtained from a Venturi tube so placed on the aircraft that the movement of the craft through the air causes air to flow through the Venturi tube to produce suction for driving the gyroscope.

If this turn indicator is used where the greatest sensitivity is desired, such as in photographic map making or in dropping aerial bombs from aircraft, the valve 18 is operated so as to run the gyroscope at high speed, and the centralizing spring 33 is weakened by the adjustment knob 34. Therefore the indicator is very sensitive, as the gyroscope is producing maximum force, while the restraining force of the centralizing spring is weak.

When the indicator is used for purposes of general navigation in clouds or fog or at night, such great sensitivity is not desired, and under these conditions the centralizing spring is strengthened, and if necessary the gyroscope is slowed down by throttling the air pipe line 17, the combined effect of which is to rid the instrument of extreme sensitivity.

On high speed aeroplanes where the suction obtained from the Venturi tube might be excessive, it is sometimes necessary to cut down the suction by throttling the suction line 17 so as to prevent the gyroscope from running at an excessive speed which would cause an erratic action of the indicator and unnecessary wear and stress on the mechanism.

While both the centralizing spring adjustment 34 and the air control adjustment 19 are used to vary the sensitivity of the indicator, their purposes are not the same, for in actual service they are most often operated and adjusted together so as to produce a result that could not be accomplished without conjoint use. It is seen therefore that the combination of the centralizing spring adjustment and the air control adjustment increases the range of sensitivity of the indicator and makes it adaptable to widely varying conditions of service; and furthermore adapts one standard make of instrument to various types of aircraft.

On aircraft it is the practice to provide an instrument board in front of the pilot on which various instruments are mounted. In order that the operator may make adjustments in flight, I provide both the air valve control handle 19 and the centralizing spring adjustment knob 34 in front of the instrument mounting flange 7 and lugs 21 close to the indicating dial of the indicator, so the operator may easily make any desired adjustments and quickly note the effect thereof by the action of the indicator hand 28 or shutter 26.

I have provided both a hand and shutter as indicating means, which is desirable in this class of navigating instruments because of the fact that the shutter indicator is easier to observe and causes less strain on the pilot during long flights, while the hand indicator is most useful when it comes to accurate straight line flight where the pilot must continuously watch the face of the instrument.

What I claim is:

1. A gyroscopic indicating instrument comprising in combination, a casing, a dial and cooperating indicating means carried therein, a gyroscope mounted in the casing so as to be sensitive to angular motion, means connecting the gyroscope with the indicating means, a plate spring having one end thereof anchored to the casing and the other end left free to flex, a coil spring having one end anchored to the free end of the plate spring and the other end attached to the gyroscope, said free end of the plate spring being adapted to subject the coil spring to tension for exerting a centralizing force against the gyroscope, and an adjusting screw carried in the casing and cooperating with the spring combination to flex the plate spring and diminish the tension of the coil spring to adjustably vary the aforesaid centralizing force.

2. A gyro instrument comprising, a gyroscope and indicating means actuated by the precession thereof; means to centralize the gyroscope comprising a plate spring, a coil spring one end of which is connected with the plate spring and the other end of which is connected with the gyroscope, and means to flex the plate spring to vary the tension of said coil spring.

3. A gyro instrument comprising, a housing, a gyroscope and indicating means actuated thereby; means to centralize the gyroscope comprising, a flat spring one end of which is anchored to the housing and the other end being flexibly free, and tension means connecting the flexibly free end of the flat spring to the gyroscope by which the latter is centralized.

4. A gyro instrument comprising, a housing, a gyroscope and indicating means actuated thereby; means to centralize the gyroscope comprising, a flat spring one end of which is anchored to the housing and the other end being flexibly free, tension means connecting the flexibly free end of the flat spring to the gyroscope by which the latter is centralized, and an adjusting screw threaded through the housing and bearing on the flat spring to regulate the strength of the tension means.

5. A gyro instrument comprising, a housing, a gyro frame and a rotor journaled therein, a pivot pin journaled in the housing and fixed to gyro frame, a plate spring fixed to the housing and having a free end, and tension means connected between the plate spring free end and the pivot pin.

In testimony whereof I affix my signature at Brooklyn, N. Y., this 22nd day of March, 1922.

CHARLES H. COLVIN.